Figure 1:
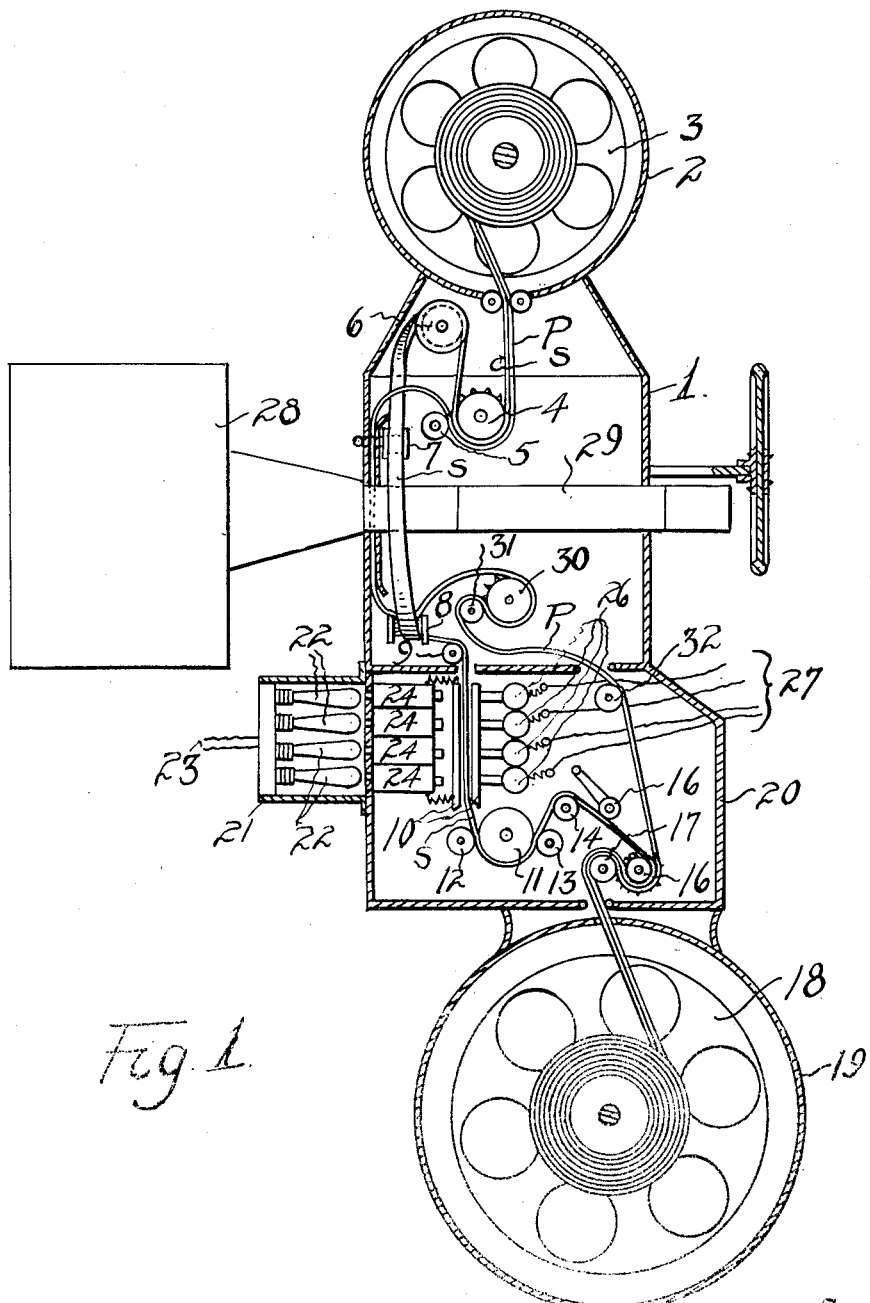

Feb. 9, 1932. L. DE FOREST 1,843,972
TALKING MOTION PICTURE APPARATUS
Filed Sept. 28, 1928 2 Sheets-Sheet 1

Inventor
Lee De Forest
By his Attorneys

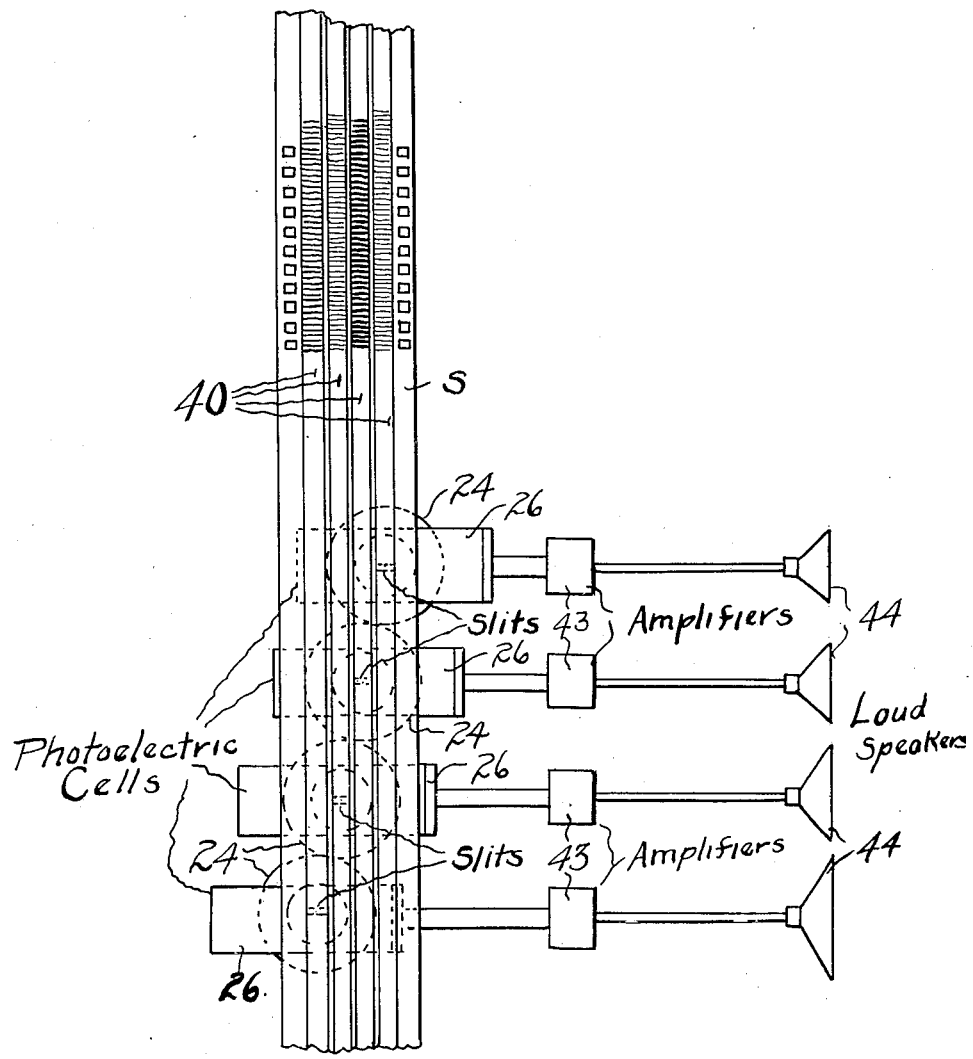

Patented Feb. 9, 1932

1,843,972

UNITED STATES PATENT OFFICE

LEE DE FOREST, OF NEW YORK, N. Y., ASSIGNOR TO DE FOREST PHONOFILM CORPORATION, OF NEW YORK, N. Y., A CORPORATION OF DELAWARE

TALKING MOTION PICTURE APPARATUS

Application filed September 28, 1928. Serial No. 309,076.

This invention relates in general to apparatus for reproducing talking motion pictures.

One of the objects of this invention relates to an apparatus for producing talking motion pictures employing separate films, one having the sound record thereon and the other having the picture record thereon.

A further object of this invention is the provision of an apparatus adapted to employ a photographic sound record having a plurality of sound tracks thereon each track representing a portion of a multiplicity of sounds as, for instance, portions of the sounds produced by an orchestra.

A further object of this invention contemplates a combined picture and sound reproducing apparatus in which the picture record is on one film and the sound record, comprising a plurality of separate sound tracks, is on another film including separate light sources, separate light sensitive cells, separate amplifiers, and separate sound reproducers so that the sounds from each sound record may be independently reproduced.

These and other objects, as will appear from the following disclosure, are secured by means of this invention.

This invention resides substantially in the combination, construction, arrangement, and relative location of parts, all as will appear more fully hereinafter.

Referring to the drawings—

Figure 1 is a vertical sectional view through the device of this invention illustrating all of the parts thereof; and Fig. 2 is a diagrammatic illustration showing the relative association of the sound film, the light sensitive cells, the amplifiers, and the sound reproducing devices.

This invention involves an improvement in talking moving picture reproducing apparatus where separate films are employed, one having the sounds phonographically recorded thereon and the other having the pictures photographically recorded thereon. It is frequently the case that it is impractical to record sounds on the same film with the picture, for example, where the picture positive only is available and not the negative for reprinting purposes. Moreover, to obtain the closest possible approximation to perfect reproduction of sound, particularly where the sound is reproduced from a large orchestra, choruses, or the like, it is necessary to employ two or more individual sound records each distinct from the other. To secure this result it is necessary to place a plurality of sound records on the same film. As a plurality of sound records would take up too much space they cannot be employed on the same film with the picture where a standard width film is employed since the space available for the picture would be substantially reduced.

This invention contemplates a simple and convenient method and apparatus for placing the picture on one film and the sound records comprising several separate tracks on a separate film and winding both films on the same reel. The two films are then simultaneously run through the projection machines of this invention, always keeping the two films in perfect synchronism with a minimum of mechanical complications and also greatly simplifying the operator's task in threading up the two films through the projecting and sound reproducing portions of the machine.

Referring to the drawings, the projection machine is shown comprising an upper casing 1 housing the usual motion picture projection apparatus by means of which the picture film is given an intermittent motion past the light source. The upper portion of the casing 1 is provided with a film magazine 2 in which the film reel is rotatably supported. In one method of using this invention the picture and sound films, which have been indicated by the legends "P" and "S", are wound on the same reel. The films then pass over a sprocket wheel 4 of the usual type and are held thereagainst by means of a smooth roller 5. The sound film then passes over a flanged spool 6 and thence down over a second roller 7 mounted on an axis at right angles to the axis of spool 6. The film then passes over another rotatable flanged spool 8 to another roller 9 which is mounted on an axis at right angles to the axis of spool 8. By means of this combination of rollers and spools the film is caused to move in a plane at right angles to the plane in which it moves when it leaves the sprocket wheel 4. Furthermore, the spools are so arranged that the film may pass by the tube 29 out of contact therewith. The film S then passes down between the plate members 10, one of which is spring pressed in order to hold the film in proper position. The film then passes over a large smooth roller 11 and is held thereagainst by means of two smooth rollers 12 and 13. After leaving roller 11 film S passes over roller 14 and onto sprocket wheel 16. The weighted lever 16 having a roller on its end lies down against the film and tends to smooth out any unsteady motion it may have. As is well understood in this art the film on which the sound record is photographed must move through the mechanism in a steady uniform manner. The sound film after leaving sprocket 16 passes over the smooth roller 17 and onto wheel 18 within the film magazine 19 supported on casing 20 in which casing is housed the phonofilm or sound reproducing mechanism.

The picture film P, after leaving the sprocket 4, passes down through tube 29. The arc light or other suitable light source for the picture reproduction is mounted within the casing 28 and the light travels through the light tube 29 in which are mounted the various lenses well known in the motion picture art for properly condensing and focusing the light rays from the source. The film is also given an intermittent motion at this point, as is well understood in this art, and has not been shown in the drawings for sake of clearness. The picture film then passes over sprocket wheel 30, roller 31, and roller 32 where it finally comes together with the sound film on sprocket wheel 16. The two films are then wound up together on the reel 18. Attached to the casing 20 is a smaller casing 21 within which four independent light sources 22 are shown. These light sources may be of any suitable kind but in best practice consist of small incandescent lamps having straight filaments, the axis of which extends into the plane of the drawings. These light sources are energized through the wires 23. The light sources 22 are in alignment with the tubes 24 which house the usual and well known lens system employed in this art comprising condensing lenses and slits so that the light from each light source is focused upon the slit.

An objective lens is also employed whereby the illuminated image of the slit is reduced and thrown sharply focused upon the sound track on the sound film in alignment with the light from the light source in the form of a fine line produced by the lens systems and the slit falls upon the light sensitive cells 26 which are provided with the wires 27. It is to be noted that each light source has its own lens systems and slit and its own photo-electric cell.

A better understanding of this arrangement can be secured from Fig. 2 in which a sound film S is shown provided with four sound tracks 40 running longitudinally of the strip and parallel to each other. This view is shown as the mechanism would appear if viewed from the left of Fig. 1. The dotted circles 24 indicate the position which the tubes 24, Fig. 1, have with respect to the film and photo-electric cell. The dotted lines marked by the legend "Slits" indicate the position of the slits with respect to each track. It is noted from this figure that the tubes 24 are staggered so as to be out of vertical alignment and thus place the slits one in alignment with each sound track. The photo-electric cells 26 are mounted one in alignment with each slit and are connected by means of wires to the amplifiers indicated generally at 43. These amplifiers represent any well known form of vacuum tube amplifier for amplifying the weak currents produced by the photo-electric cells. These currents are supplied through wires to the sound reproducing devices 44 which may represent any well known form of electrical loud speaker.

It is pointed out that in recording the music for a large orchestra, for instance, better results and more perfect reproduction are secured if a plurality of microphones are spacially located with respect to the orchestra so that one microphone can pick up sounds from the base instruments, another from the percussion instruments, a third from the violins, and a fourth from the brasses, for example. The electrical currents from each of these microphones are converted into light of varying intensity in the usual well known manner and recorded as separate sound records on the film S to give the four tracks 40. In the reproducing apparatus the sounds represented by each track is converted by means of the four separate systems comprising a light source, a light tube, a slit, a photo-electric cell, an amplifier, and a loud speaker. For best results the loud speakers and amplifying systems may be arranged and adjusted to reproduce most faithfully the vibrations characteristic of the instruments from which the sound records were made.

In the operation of the device the camera which is driven from any suitable power source causes the picture film to travel down through the light tube 29 in an intermittent motion to reproduce the pictures in the usual well known manner. The sound film is caused to move through the phonofilm attachment and the records thereon cooperate with their respective light sources and their respective photo-electric cells to generate corresponding currents which when amplified and applied to the loud speakers produce the sounds recorded on the film.

I am, of course, well aware that many changes in the details of construction and relative arrangement of parts will readily occur to those skilled in this art and I do not, therefore, desire to be strictly limited to the disclosure as given for purposes of illustration but rather to the principles and scope of this invention. The invention itself resides in the general combination of elements rather than in the specific construction of any of the particular parts since, in general, the individual parts are all old and well known in the art. The general association of elements, as well as the idea of employing separate light sources, lens systems, photo-electric cells, amplifiers, and loud speakers, constitutes a new departure in this art. As an example of what I consider is within the scope of this invention it may be pointed out that the two films might, if desired, be wound upon separate reels and caused to come together at the sprocket 4 or, in fact, pass directly to the intermittent feed of the picture apparatus and the continuous feed of the phonofilm apparatus. As a result I desire to be restricted by the scope of the appended claims rather than by the disclosure.

What I seek to secure by United States Letters Patent is:—

1. In a sound and picture reproducing apparatus employing separate photographic picture and sound films wound one over the other on a reel, the combination comprising means for effecting picture projection from the picture film, means for producing sounds controlled by the sound film, means for moving the two films simultaneously to cooperate with said means respectively, and guiding means for separating the two films as they come from the reel and directing them along separate paths of travel.

2. In a device as described, the combination comprising a film reel having two films wound thereon in superposition, one a sound film and one a picture film, means for reproducing pictures from the picture film, means for reproducing sounds from the sound film, means to cause synchronized movement of said films past their respective means to produce talking motion pictures, means for guiding the films along separate paths to both of said reproducing means, a take up reel and means for winding the two films onto the take up reel in superposition.

3. In a mechanism for the purposes disclosed, the combination comprising a casing, two reels, two films, one a picture film and the other a photographic sound film mounted on said reels in parallel convolutions, means mounted in said casing for effecting motion picture projection from the photographic film, means in said casing for converting photographic sound films into varying electrical currents, the said last two means being in superposed relation, means for separating the films in transit, and means for simultaneously advancing said films through said means from one reel to the other and for bringing the films together upon said latter reel.

4. In a mechanism for the purpose disclosed, the combination comprising a casing, two reels, a picture film and a sound film carried by said reels, picture film advancing means within the casing, sound film advancing means also in the casing, picture projecting means mounted in the casing, electrical sound conversion means for the sound film mounted in the casing, means for separating the films in transit whereby the picture film is acted upon by the projection means and the sound film acts upon the electrical sound conversion means, and means for guiding the films together before being wound upon the second reel.

5. A talking motion picture apparatus, including in combination a supporting casing, two reels mounted in spaced relation to each other, a picture film and a sound photographic film supported by said reels, said films being in parallel convolutions, picture film progressing and projecting means mounted in the casing, a sound-on-film reproducing and progressing means also mounted in the casing, and means for by-passing the sound photographic film out of contact with the picture film at a point before the picture film is acted upon by the projecting mechanism and before the sound film has moved past the sound-on-film reproducer.

6. A talking motion picture apparatus, including in combination a supporting casing, two reels mounted in spaced relation to each other, a picture film and a sound photographic film supported by said reels, said films being in parallel convolutions, picture film progressing and projecting means mounted in the casing, a sound-on-film reproducing and progressing means also mounted in the casing, and mechanism mounted in the casing for separating the films so that the picture film and the sound film will move through their respective projecting and reproducing means separately and independently but in unison.

7. A talking motion picture apparatus including in combination a supporting casing, two reels, one mounted at the upper end and the other at the lower portion of the casing, a picture film and a sound photographic film mounted in parallel convolutions upon the upper reel and extended through the casing to the lower reel, two film progressing mechanisms one of which is intermittent and the other of which is continuous mounted within the casing and operated in unison, a picture projecting mechanism adjacent to the intermittent mechanism, a sound-on-film reproducing mechanism adjacent to the continuous mechanism, and means above and below the projecting mechanism for separating and guiding the sound film in spaced relation past the projecting mechanism and to the sound-on-film reproducing mechanism, and means for bringing the films into co-extensive relation before engaging the lower reel.

In testimony whereof I have hereunto set my hand on this 25th day of September, A. D. 1928.

LEE DE FOREST.